United States Patent
Shin et al.

(10) Patent No.: US 12,548,713 B2
(45) Date of Patent: Feb. 10, 2026

(54) MULTILAYER ELECTRONIC COMPONENT

(71) Applicant: SAMSUNG ELECTRO-MECHANICS CO., LTD., Suwon-si (KR)

(72) Inventors: Seung Ho Shin, Suwon-si (KR); Ji Yeon Kim, Suwon-si (KR); Si Taek Park, Suwon-si (KR); Sang Kyu Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 157 days.

(21) Appl. No.: 18/623,801

(22) Filed: Apr. 1, 2024

(65) Prior Publication Data

US 2024/0355545 A1 Oct. 24, 2024

(30) Foreign Application Priority Data

Apr. 20, 2023 (KR) ........................ 10-2023-0052148

(51) Int. Cl.
*H01G 4/12* (2006.01)
*H01G 4/30* (2006.01)
*H01G 4/008* (2006.01)

(52) U.S. Cl.
CPC ............ *H01G 4/1227* (2013.01); *H01G 4/30* (2013.01); *H01G 4/0085* (2013.01)

(58) Field of Classification Search
None
See application file for complete search history.

(56) References Cited

U.S. PATENT DOCUMENTS

| | | | |
|---|---|---|---|
| 4,082,906 A * | 4/1978 | Amin | H01G 4/0085 361/309 |
| 4,430,689 A * | 2/1984 | Lagrange | H01G 4/1227 252/514 |
| 4,612,600 A * | 9/1986 | Hodgkins | C04B 35/465 29/25.42 |
| 4,887,186 A * | 12/1989 | Takeda | C04B 35/6342 252/519.1 |
| 5,601,748 A * | 2/1997 | Mansour | C04B 35/468 501/137 |
| 9,637,414 B2 * | 5/2017 | Shimizu | H01G 4/1227 |
| 2012/0270720 A1* | 10/2012 | Tanabe | C03C 8/22 501/134 |
| 2016/0376197 A1* | 12/2016 | Shimizu | C04B 35/475 361/321.5 |

(Continued)

FOREIGN PATENT DOCUMENTS

| | | | | |
|---|---|---|---|---|
| CN | 114560693 A * | 5/2022 | ........... | H01G 4/1227 |
| EP | 3527546 A1 * | 8/2019 | ............. | C04B 35/47 |

(Continued)

*Primary Examiner* — Dion R. Ferguson
(74) *Attorney, Agent, or Firm* — Morgan Lewis & Bockius LLP

(57) ABSTRACT

A multilayer electronic component includes a body including a dielectric layer including Ba and Ti and an internal electrode disposed alternately with the dielectric layer; and an external electrode disposed on the body, wherein the dielectric layer further includes Li and F, and wherein a content of Li included in the dielectric layer is 0.02 mole or more and 0.36 mole or less based on 100 moles of Ba included in the dielectric layer.

16 Claims, 5 Drawing Sheets

(56) References Cited

U.S. PATENT DOCUMENTS

2023/0104924 A1\* 4/2023 Higgs .................. C23C 14/223
                                                                                   427/248.1
2024/0355545 A1\* 10/2024 Shin .................... H01G 4/1227

FOREIGN PATENT DOCUMENTS

| JP | H07-277817 A | | 10/1995 | | |
|----|----|----|----|----|----|
| JP | 7204689 B2 | \* | 1/2023 | ......... | C04B 35/5805 |
| JP | 2023525291 A | \* | 6/2023 | .......... | H01M 8/1016 |
| KR | 10-2008-0052605 A | | 6/2008 | | |
| WO | 2007/040671 A1 | | 4/2007 | | |

\* cited by examiner

MULTILAYER ELECTRONIC COMPONENT

CROSS-REFERENCE TO RELATED APPLICATION(S)

This application claims benefit of priority to Korean Patent Application No. 10-2023-0052148 filed on Apr. 20, 2023 in the Korean Intellectual Properties Office, the disclosure of which is incorporated herein by reference in its entirety.

BACKGROUND

1. Technical Field

The present disclosure relates to a multilayer electronic component.

2. Description of the Related Art

A multilayer ceramic capacitor (MLCC), a multilayer electronic component, may be a chip-type condenser mounted on a printed circuit board of various electronic products such as a liquid crystal display (LCD) and a plasma display panel (PDP), a computer, a smartphone, and charging or discharging electricity.

When a dielectric layer having a reduced thickness is formed to miniaturize a multilayer electronic component and to implement high capacitance, stable capacitance and high reliability may be necessary. In particular, when the dielectric layer is formed to have a reduced thickness, it may be effective to reduce a difference in firing temperature between the dielectric layer and the internal electrode in order to reduce a difference in shrinkage behavior with the internal electrode.

Generally, since the firing temperature of a conductive metal included in the internal electrode is lower than the firing temperature of the ceramic included in the dielectric layer, agglomeration may occur in the internal electrode during the process of firing the multilayer electronic component, and accordingly, a short circuit may occur in the multilayer electronic component. Also, a difference in shrinkage behaviors of the internal electrode and the dielectric layer may generate stress in the multilayer electronic component, and accordingly, reliability of the multilayer electronic component may degrade.

Accordingly, it may be necessary to develop a method to simultaneously fire the internal electrode and the dielectric layer at a relatively low temperature and to reduce the difference in shrinkage behaviors between the internal electrode and the dielectric layer.

SUMMARY

An example embodiment of the present disclosure is to alleviate a decrease in reliability of a multilayer electronic component caused by a difference in firing temperatures between an internal electrode and a dielectric layer.

An example embodiment of the present disclosure is to prevent a low-temperature sintering aid from volatilizing excessively during a process of firing the multilayer electronic component when a low-temperature sintering aid is added to a dielectric composition to lower a firing temperature of a dielectric layer.

According to an example embodiment of the present disclosure, a multilayer electronic component includes a body including (i) a dielectric layer including Ba, Ti, Li, and F, and (ii) an internal electrode disposed alternately with the dielectric layer; and an external electrode disposed on the body, wherein a content of Li included in the dielectric layer is 0.02 mole or more and 0.36 mole or less based on 100 moles of Ba included in the dielectric layer.

According to another example embodiment of the present disclosure, a method of manufacturing a multilayer electronic component includes: a process of forming a body including (i) a dielectric layer including Ba, Ti, Li, and F, and (ii) an internal electrode disposed alternately with the dielectric layer; and a process of forming an external electrode disposed on the body, wherein a content of Li included in the dielectric layer is 0.02 mole or more and 0.36 mole or less based on 100 moles of Ba included in the dielectric layer.

According to an example embodiment of the present disclosure, a multilayer electronic component includes a body including (i) a dielectric layer including Ba, Li, and F, the dielectric layer including a plurality of dielectric grains, wherein an average grain size of the plurality of dielectric grains is 150 nm or more and 250 nm or less and (ii) an internal electrode disposed alternately with the dielectric layer; and an external electrode disposed on the body, wherein a content of Li included in the dielectric layer is 0.02 mole or more and 0.36 mole or less based on 100 moles of Ba included in the dielectric layer.

BRIEF DESCRIPTION OF DRAWINGS

The above and other aspects, features, and advantages of the present disclosure will be more clearly understood from the following detailed description, taken in combination with the accompanying drawings, in which.

DETAILED DESCRIPTION

Figure 1:
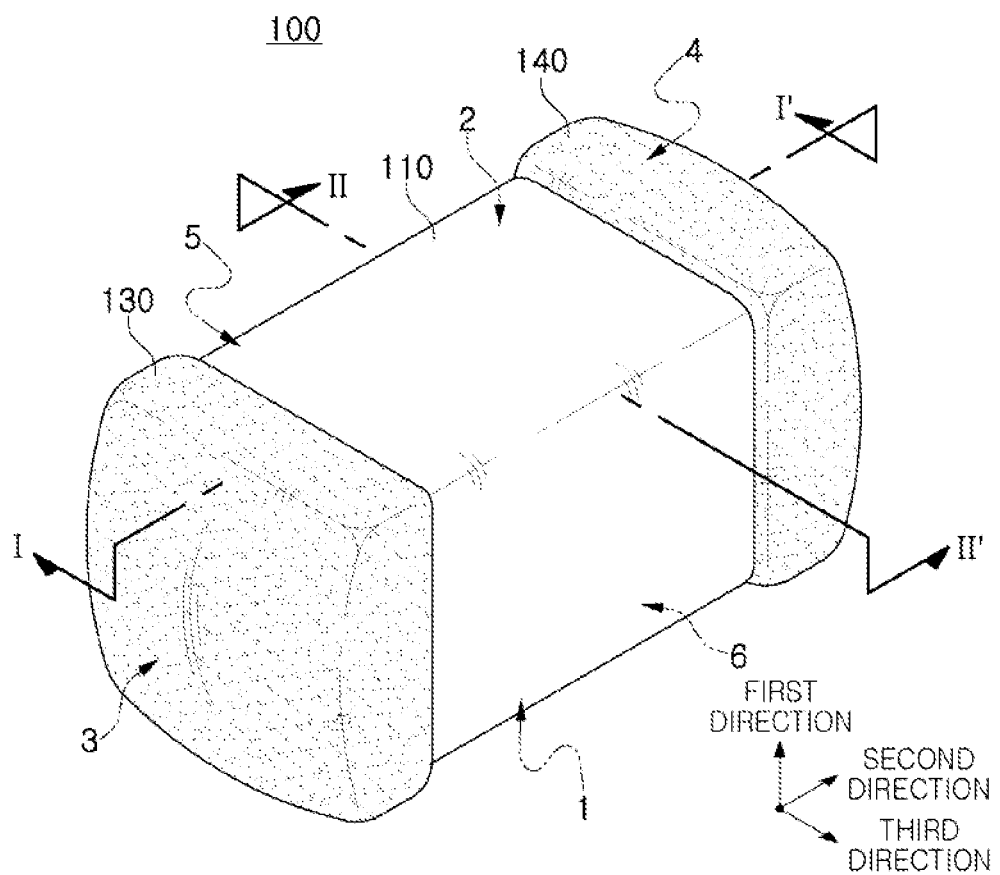
FIG. 1 is a perspective diagram illustrating a multilayer electronic component according to an example embodiment of the present disclosure.

Hereinafter, embodiments of the present disclosure will be described below with reference to the accompanying drawings.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after a gaining an understanding of the disclosure of this application.

In the drawings, same elements will be indicated by the same reference numerals. Also, redundant descriptions and detailed descriptions of known functions and elements which may unnecessarily render the gist of the present disclosure obscure will not be provided. In the accompanying drawings, some elements may be exaggerated, omitted or briefly illustrated, and the sizes of the elements may not necessarily reflect the actual sizes of these elements. The terms, "include," "comprise," "is configured to," or the like of the description are used to indicate the presence of features, numbers, steps, operations, elements, portions or combination thereof, and may not exclude the possibilities of combination or addition of one or more features, numbers, steps, operations, elements, portions or combination thereof.

In the drawings, a first direction may be defined as a direction in which first and second internal electrodes are alternately disposed with a dielectric layer interposed therebetween or a thickness T direction, among second and third directions perpendicular to the first direction, a second direction may be defined as a length L direction, and a third direction may be defined as a width W direction.

Multilayer Electronic Component

FIG. 1 is a perspective diagram illustrating a multilayer electronic component according to an example embodiment.

Figure 2:
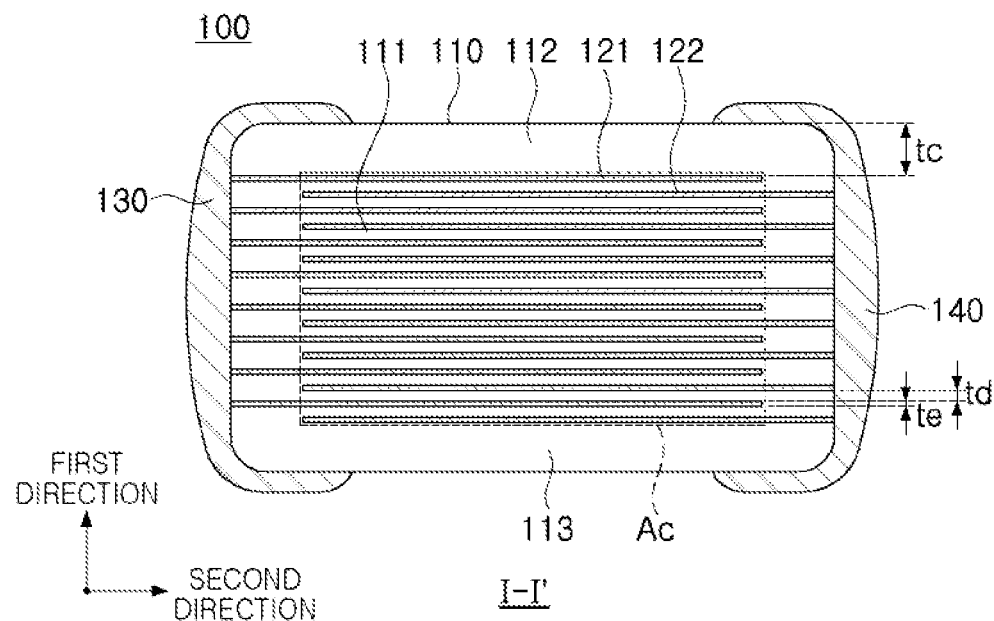
FIG. 2 is a cross-sectional diagram taken along line I-I' in FIG. 1.

FIG. 2 is a cross-sectional diagram taken along line I-I' in FIG. 1.

Figure 3:
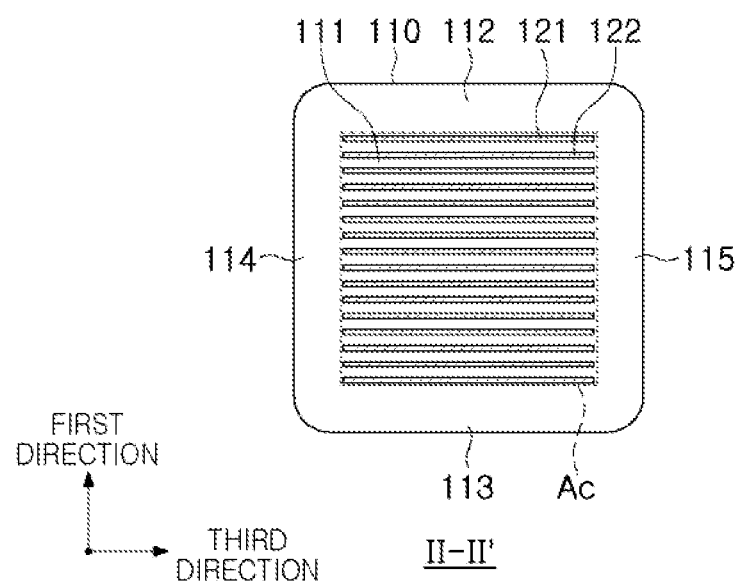
FIG. 3 is a cross-sectional diagram taken along line II-II' in FIG. 1.

FIG. 3 is a cross-sectional diagram taken along line II-II' in FIG. 1.

Hereinafter, a multilayer electronic component and a method of manufacturing a multilayer electronic component according to an example embodiment will be described in greater detail with reference to FIGS. 1 to 3.

A multilayer electronic component 100 according to an example embodiment may include The body 110 includes a dielectric layer 111 including Ba and Ti and internal electrodes 121 and 122 disposed alternately with the dielectric layer 111.

The shape of the body 110 may not be limited to any particular shape, but as illustrated, the body 110 may have a hexahedral shape or a shape similar to a hexahedral shape. Due to reduction of ceramic powder included in the body 110 during a firing process, the body 110 may not have an exactly hexahedral shape formed by linear lines but may have a substantially hexahedral shape.

The body 110 may have first and second surfaces 1 and 2 opposing each other in the first direction, third and fourth surfaces 3 and 4 connected to the first and second surfaces 1 and 2 and opposing in the second direction, and fifth and sixth surfaces 5 and 6 connected to the first and second surfaces 1 and 2 and the third and fourth surfaces 3 and 4 and opposing each other in the third direction.

The plurality of dielectric layers 111 forming the body 110 may be in a fired state, and a boundary between the adjacent dielectric layers 111 may be integrated with each other such that the boundary may not be distinct without using a scanning electron microscope (SEM).

In an example embodiment, a raw material for forming the dielectric layer 111 is not limited to any particular example as long as sufficient capacitance may be obtained therewith. For example, a barium titanate-based material, a lead composite perovskite-based material, or a strontium titanate-based material may be used. The barium titanate material may include $BaTiO_3$ ceramic powder, and an example of the ceramic powder may include $(Ba_{1-x}Ca_x)TiO_3$ (0<x<1), $Ba(Ti_{1-y}Ca_y)O_3$ (0<y<1), $(Ba_{1-x}Ca_x)(Ti_{1-y}Zr_y)O_3$ (0<x<1, 0<y<1) or $Ba(Ti_{1-y}Zr_y)O_3$ (0<y<1) in which Ca (calcium), Zr (zirconium) is partially solid-solute.

Also, various ceramic additives, organic solvents, binders, dispersants, or the like, may be added to a raw material for forming the dielectric layer 111 in the embodiment to powder such as barium titanate ($BaTiO_3$).

Generally, the dielectric layer 111 included in the body 110 of the multilayer electronic component 100 may be formed through a firing process at a high temperature of 1100 degrees or more, such that it may be difficult to form the dielectric layer 111 to have a reduced thickness. Also, since the dielectric layer 111 is disposed alternately with the internal electrodes 121 and 122, a difference in shrinkage behavior may occur between the internal electrodes 121 and 122. The difference in shrinkage behavior between the dielectric layer 111 and the internal electrodes 121 and 122 may generate stress in the multilayer electronic component 100, which may cause cracks in the multilayer electronic component 100.

Generally, $Li_2CO_3$ may be used as a sintering aid for the dielectric layer 111 to enable firing at low temperatures and to improve properties of the dielectric layer. However, $Li_2CO_3$ may easily volatilize during the process of firing the dielectric layer, which may cause discoloration and defective reliability. Accordingly, in the example embodiment, by using LiF as a low-temperature sintering aid instead of $Li_2CO_3$, and adjusting the content of Li or F included in the dielectric layer of the multilayer electronic component after firing, the thickness of the multilayer electronic component may be reduced and electrical and mechanical properties may be improved.

In an example embodiment, the dielectric layer 111 may further include Li and F in addition to Ba and Ti. Li and F may be added to the dielectric layer 111 and may control a microstructure of the dielectric layer, such as a dielectric average grain size and porosity, or variables in the sintering process, such as sintering temperature and sintering pressure.

When the Li content included in the dielectric layer 111 is less than 0.02 mole based on 100 moles of Ba included in the dielectric layer 111, the effect of lowering the sintering initiation temperature of the dielectric layer 111 may be insufficient. When the Li content included in the dielectric layer 111 exceeds 0.36 mole based on 100 moles of Ba included in the dielectric layer 111, it may be difficult to sufficiently increase insulation resistance of the dielectric layer 111. According to an example embodiment, the dielectric layer 111 may include Li and F, and the Li content included in the dielectric layer may be 0.02 mole or more and 0.36 mole or less based on 100 moles of Ba included in the dielectric layer. Accordingly, density of the dielectric layer 111 may be improved, and a difference in shrinkage behavior between the dielectric layer 111 and the internal electrodes 121 and 122 may be reduced such that connectivity between the internal electrodes may improve, capacitance reduction may be prevented, and deterioration of insulation resistance may be suppressed. This effect may become more prominent when the content of F included in dielectric layer 111 is 0.49 mole or more and 0.88 mole or less based on 100 moles of Ba included in dielectric layer 111.

An example of measuring the content of Li and F may include inductively coupled plasma mass spectrometry (ICP-MS). Other methods and/or tools appreciated by one of ordinary skill in the art, even if not described in the present disclosure, may also be used.

As a more specific example of measuring the content of Li based on 100 moles of Ba and the content of F based on 100 moles of Ba included in the dielectric layer 111 included in the multilayer electronic component 100, such as an example embodiment, a method of analyzing using Laser Ablation—Inductively Coupled Plasma—Mass Spectrometry (LA-ICP-MS) by irradiating a laser beam is irradiated on the surface of the first and second direction cross-sections polished to the center of the second direction or the first and third direction cross-sections polished to the third direction center of the multilayer electronic component 100 may be used. In this case laser irradiation may be performed on the central region of the dielectric layer 111 disposed in the center of each region after dividing the capacitance forming portion Ac into third regions in the first direction. The contents of Ba, Li, and F calculated by irradiating a laser to each region may be converted into the Li content based on 100 moles of Ba and the content of F based on 100 moles of Ba, and an average value thereof may be obtained, such that the content of Li based on 100 moles of Ba and the content of F based on 100 moles of Ba included in dielectric layer 111 may be further generalized.

The addition of Li and F to the dielectric layer 111 may be important. Specifically, materials such as $Li_2CO_3$, which is generally added to the dielectric layer as a sintering aid, may easily volatilize during the sintering process, such that the material may not sufficiently assist the mass transfer of $BaTiO_3$, the main component of the dielectric layer, in the region around 1100° C., which is close to the firing temperature of the multilayer electronic component. Specifically, in materials such as $Li_2CO_3$, which is a general sintering aid, a mass loss of about −55% may occur around 1100° C., such that it may be difficult for the material to properly work as a sintering aid.

LiF, a sintering aid added to dielectric layer 111, may have a melting point lower than 1000° C., such that LiF may form a liquid phase from a temperature region lower than the firing temperature of the multilayer electronic component (1100-1200° C.), and LiF may have a relatively high boiling point of over 1600° C., such that the amount of volatilization during firing may be relatively small. Accordingly, in an example embodiment, by adding LiF to the dielectric layer 111 as a sintering aid, discoloration defects and reliability degradation of the multilayer electronic component may be suppressed.

When LiF is used as a sintering aid for the dielectric layer 111, the phase change of LiF before and after the firing process of the multilayer electronic component 100 may be reduced. That is, in an example embodiment, at least a portion of Li and F included in the dielectric layer 111 may be present in the form of LiF.

In an example embodiment, the dielectric layer 111 may include a plurality of dielectric grains, and the average grain size of the plurality of dielectric grains may be 150 nm or more and 250 nm or less. Accordingly, both insulation resistance and reliability of the multilayer electronic component 100 may be secured.

As an example of a method of measuring the average grain size of a plurality of dielectric grains, in a cross-section in the first and third directions polished to the center in the second direction or a cross-section in the first and second directions polished to the center in the third direction of the multilayer electronic component 100, the capacitance forming portion Ac may be divided into third regions in the first direction, and an average value of the grain size observed in the 10 μm×10 μm region in the center of the dielectric layer 111 disposed in the center of each region using a scanning electron microscope (SEM) may be obtained. In this case the average value of the grain size may be determined by measuring the length of the minor axis and major axis of each grain and averaging the lengths, or by measuring the area of the grains in pixels and converting the measurement to an equivalent circle diameter. Other methods and/or tools appreciated by one of ordinary skill in the art, even if not described in the present disclosure, may also be used.

In an example embodiment, the average density of the dielectric layer 111 may be 95% or more and 99% or less. According to an example embodiment, since the dielectric layer 111 includes Li and F, and the content of Li included in the dielectric layer 111 is adjusted to 0.02 mole or more and 0.36 mole or less based on 100 moles of Ba included in the dielectric layer, sintering may be performed even at relatively low temperatures below 1080° C., and even through the low-temperature sintering process is performed, density of the dielectric layer 111 may be improved. In this case the average density of the dielectric layer 111 may be 95% or more and 99% or less.

In an example embodiment, the density of the dielectric layer may refer to the ratio of an area of the region excluding pores in the dielectric layer to an area of the region of the dielectric layer including pores. As an example of a method of measuring the average density of the dielectric layer 111, in a cross-section in the first and third directions polished to the center in the second direction or a cross-section in the first and second directions polished to the center in the third direction of the multilayer electronic component 100, the capacitance forming portion Ac may be divided into third regions in the first direction, the average value of the measured area ratio may be obtained by observing the 10 μm×10 μm region in the center of the dielectric layer 111 disposed in the center of each region with a scanning electron microscope (SEM), and the "100—area ratio" value may be defined as average density of the dielectric layer in the example embodiment, but an example embodiment thereof is not limited thereto. Other methods and/or tools appreciated by one of ordinary skill in the art, even if not described in the present disclosure, may also be used.

The average thickness td of the dielectric layer 111 may not be limited to any particular example. Generally, when a dielectric layer is formed to have an average thickness of less than 0.6 μm, especially when a multilayer electronic component is miniaturized, such as when the average thickness td of the dielectric layer is less than 0.35 μm, it may be difficult to control the sintering shrinkage of the dielectric layer 111.

According to an example embodiment, since the content of Li included in the dielectric layer 111 is adjusted to be 0.02 mole or more and 0.36 mole or less based on 100 moles of Ba included in the dielectric layer, even when the average thickness td of the dielectric layer is 0.35 μm or less, by controlling sintering shrinkage of the dielectric layer 111, capacitance properties and reliability of the multilayer electronic component 100 may be improved.

Accordingly, when the average thickness td of the dielectric layer 111 is 0.35 μm or less, the effect of improving capacitance properties and reliability according to the example embodiment may be prominent.

The average thickness td of the dielectric layer 111 may refer to the average thickness of the dielectric layer 111 disposed between the first and second internal electrodes 121 and 122.

The average thickness td of the dielectric layer 111 may be measured by scanning a cross-section of the body 110 in the length and thickness directions (L-T) using a scanning electron microscope (SEM) with a magnification of 10,000. More specifically, an average value may be measured from the thicknesses of the dielectric layer 111 at 30 points spaced apart by an equal distance in the length direction in the scanned image. The 30 points at equal distances may be designated in the active portion Ac. Also, when the average value is measured by extending the measurement of the average value to ten dielectric layers 111, the average thickness of the dielectric layer may be further generalized. Other methods and/or tools appreciated by one of ordinary skill in the art, even if not described in the present disclosure, may also be used.

The body 110 is disposed in the body 110 and may include a capacitance forming portion Ac including a first internal electrode 121 and a second internal electrode 122 disposed to face each other with the dielectric layer 111 in between.

The capacitance forming portion Ac may contribute to capacitance formation of a capacitor, and may be formed by repeatedly laminating a plurality of first and second internal electrodes 121 and 122 with a dielectric layer 111 interposed therebetween.

Referring to FIG. 2, cover portions 112 and 113 may be disposed on one surface and the other surface in the first direction of the capacitance forming portion Ac. The cover portions 112 and 113 may be formed by laminating a single dielectric layer or two or more dielectric layers on each of upper and lower surfaces of the capacitance forming portion Ac in the thickness direction, and may prevent damages to the internal electrodes caused by physical or chemical stress.

The cover portions 112 and 113 may not include internal electrodes and may include the same material as that of the dielectric layer 111. That is, the cover portions 112 and 113 may include a ceramic material, for example, barium titanate ($BaTiO_3$) ceramic material.

The average thickness of the cover portions 112 and 113 may not be limited to any particular example. However, to easily obtain miniaturization and high capacitance of the multilayer electronic component, the average thickness tc of the cover portions 112 and 113 may be 15 μm or less.

Here, the average thickness of the cover portions 112 and 113 may refer to the size in the first direction, and may be an average value of the sizes of the cover portions 112 and 113 in the first direction, measured at five points at equal distances above or below the capacitance forming portion Ac.

Referring to FIG. 3, margin portions 114 and 115 may be disposed on one surface and the other surface of the capacitance forming portion Ac in the third direction.

The margin portions 114 and 115 may include a margin portion 114 disposed on the fifth surface 5 and a margin portion 115 disposed on the sixth surface 6 of the body 110. That is, the margin portions 114 and 115 may be disposed on both side surfaces of the body 110 in the width direction.

As illustrated in FIG. 3, the margin portions 114 and 115 may refer to a region between both ends of the first and second internal electrodes 121 and 122 and the boundary surface of the body 110 in a cross-section of the body 110 taken in the width-thickness (W-T) direction.

The margin portions 114 and 115 may prevent damages to the internal electrode due to physical or chemical stress.

The margin portions 114 and 115 may be formed by forming internal electrodes by applying a conductive paste on the ceramic green sheet other than the region in which the margin portions are formed.

Also, to prevent a step difference due to the internal electrodes 121 and 122, after laminating, the internal electrodes may be cut out to be exposed to the fifth and sixth surfaces 5 and 6 of the body, a single dielectric layer or two or more dielectric layers may be laminated on both side surfaces of the capacitance forming portion Ac in the width direction, thereby forming the margin portions 114 and 115.

The width of the margin portion 114 and 115 may not be limited to any particular example. However, the average width of the margin portions 114 and 115 may be 15 μm or less to easily obtain miniaturization and high capacitance of the multilayer electronic component.

The average width of the margin portion 114 and 115 may refer to the average size of the margin portion 114 and 115 in the third direction, and may be a value obtained by averaging the size of the margin portion 114 and 115 in the third direction measured at 5 points spaced apart by an equal distance on the side of the capacitance forming portion Ac.

The internal electrodes 121 and 122 may be alternately laminated with the dielectric layer 111.

The internal electrodes 121 and 122 may include first and second internal electrodes 121 and 122. The first and second internal electrodes 121 and 122 may be alternately disposed to oppose each other with the dielectric layer 111 included in the body 110 interposed therebetween, and may be exposed to the third and fourth surfaces 3 and 4 of the body 110, respectively.

Referring to FIG. 2, the first internal electrode 121 may be spaced apart from the fourth surface 4 and may be exposed through the third surface 3, and the second internal electrode 122 may be spaced apart from the third surface 3 and may be exposed through the fourth surface 4.

In this case, the first and second internal electrodes 121 and 122 may be electrically separated from each other by the dielectric layer 111 disposed therebetween.

The material for forming the internal electrodes 121 and 122 is not limited to any particular example, and a material having excellent electrical conductivity may be used. For example, the internal electrodes 121 and 122 may include one or more of nickel (Ni), copper (Cu), palladium (Pd), silver (Ag), gold (Au), platinum (Pt), tin (Sn), tungsten (W), titanium (Ti), and alloys thereof.

The average thickness te of the internal electrodes 121 and 122 may not need to be limited to any particular example. Generally, when an internal electrode is formed to have a thickness less than 0.6 μm, especially when a multilayer electronic component is miniaturized such as when the thickness of the internal electrode is less than 0.35 μm, it may be difficult to adjust a difference in shrinkage behavior between internal electrodes 121 and 122 and the dielectric layer 111, such that it may be difficult to improve reliability of the multilayer electronic component 100.

According to an example embodiment, the dielectric layer 111 includes Li and F, and the content of Li included in the dielectric layer 111 is adjusted to 0.02 mole or more and 0.36 mole or less based on 100 moles of Ba included in the dielectric layer, even when the average thickness of internal electrodes 121 and 122 is less than 0.35 μm, excellent reliability may be secured.

Accordingly, when the thickness of the internal electrodes 121 and 122 is 0.35 μm or less on average, the effect according to the example embodiment may be prominent, and miniaturization and high capacitance of the multilayer electronic component may be easily obtained.

The average thickness te of the internal electrodes 121 and 122 may refer to the average thickness te of the internal electrodes 121 and 122.

The average thickness of the internal electrodes 121 and 122 may be measured by scanning a cross-section of the body 110 in the length and thickness direction (L-T) using a scanning electron microscope (SEM) with a magnification of 10,000. More specifically, an average value may be measured from the thicknesses of the internal electrodes 121 and 122 at 30 points spaced apart by an equal distance in the second direction in the scanned image. The 30 points at equal distances may be designated in the active portion Ac. Also, when the average value is measured by extending the measurement of the average value to ten internal electrodes 121 and 122, the average thickness of the internal electrodes 121 and 122 may be further generalized. Other methods and/or tools appreciated by one of ordinary skill in the art, even if not described in the present disclosure, may also be used.

In an example embodiment, the internal electrodes 121 and 122 may include Ni. Since the firing temperature (about 950° C.) of Ni included in internal electrodes 121 and 122 is much lower than the firing temperature (about 1100-1200° C.) of barium titanate-based material, which may be the main component of dielectric layer 111, in the process of firing the body 110, electrode agglomeration, decrease in electrode connectivity, decrease in electrode coverage, and oxidation of the electrodes may occur in the internal electrodes 121 and 122. Accordingly, capacitance of the multilayer electronic component 100 may be reduced or insulation resistance may be reduced. However, according to an example embodiment, since the Li content included in the dielectric layer 111 is adjusted to 0.02 mole or more and 0.36 mole or less based on 100 moles of Ba included in the dielectric layer, the firing temperature of the body 110 may be determined to be at least 20 degrees lower than before, such that electrode agglomeration, reduction of electrode connectivity, reduction of electrode coverage, and oxidation of electrodes on the internal electrodes 121 and 122 may be alleviated. The effect may become prominent when the content of F included in dielectric layer 111 is 0.49 mole or more and 0.88 mole or less based on 100 moles of Ba included in dielectric layer 111.

In an example embodiment, the content of Ni included in internal electrodes 121 and 122 may be 95 at % or more based on the total content of other elements excluding Ni included in internal electrodes 121 and 122. According to an example embodiment, since the content of Li included in the dielectric layer 111 is adjusted to 0.02 mole or more and 0.36 mole or less based on 100 moles of Ba included in the dielectric layer, when the content of Ni included in the internal electrode is 95 at % or more based on the total content of other elements excluding Ni included in the internal electrode, the difference in shrinkage behavior between the dielectric layer 111 and internal electrodes 121 and 122 may be reduced. Similarly, as in an example embodiment, this effect may become prominent when the content of F included in the dielectric layer 111 is 0.49 mole or more and 0.88 mole or less based on 100 moles of Ba included in the dielectric layer 111.

The external electrodes 131 and 132 may be disposed on the body 110.

The external electrodes 130 and 140 may include a first external electrode 130 in contact with the third surface 3 of the body 110 and a second external electrode 140 in contact with the fourth surface 4 of the body 110.

In the example embodiment, the multilayer electronic component 100 may have two external electrodes 131 and 132, but the number and shape of the external electrodes 131 and 132 may be varied depending on the internal electrodes 121 and 122 or for other purposes.

The external electrodes 131 and 132 may be formed of any material having electrical conductivity, such as metal, and a specific material may be determined in consideration of electrical properties and structural stability, and the external electrodes 131 and 132 may have a multilayer structure.

For example, the external electrodes 131 and 132 may include electrode layers disposed on the body 110 and plating layers disposed on the electrode layers 131*a* and 132*a*.

For a more specific example of the electrode layers, the electrode layers may be sintered electrodes including a first conductive metal and glass, or a resin-based electrode including a conductive metal and resin.

Also, the electrode layers may have a form in which a plastic electrode and a resin-based electrode are formed in order on the body. Also, the electrode layers may be formed by transferring a sheet including a conductive metal onto a body or by transferring a sheet including a conductive metal onto a fired electrode.

A material having excellent electrical conductivity may be used as the conductive metal included in the electrode layers 131*a* and 132*a*. For example, the conductive metal may be at least one of nickel (Ni), copper (Cu), and alloys thereof, and may be copper (Cu) to improve adhesion to the body preferably.

The plating layers may improve mounting properties. The type of the plating layers is not limited to any particular example, and a plating layer including at least one of Ni, Sn, Pd, and alloys thereof, or may include a plurality of layers.

For a more specific example of the plating layers 131*c* and 132*c*, the plating layers may be Ni plating layers or Sn plating layers, and Ni plating layers and Sn plating layers may be formed in order on the electrode layers, and a Sn plating layer, a Ni plating layer, and a Sn plating layer may be formed in order. Also, the plating layers may include a plurality of Ni plating layers and/or a plurality of Sn plating layers.

Method of Manufacturing a Multilayer Electronic Component

Hereinafter, a method of manufacturing the multilayer electronic component 100 according to an example embodiment will be described in detail.

However, the method of manufacturing the multilayer electronic component 100 according to the example embodiment described above is not limited to the example described below. Also, descriptions overlapping the descriptions described above will not be provided.

A method of manufacturing the multilayer electronic component 100 according to an example embodiment includes forming a body including a dielectric layer including Ba and Ti and an internal electrode disposed alternately with the dielectric layer; and forming an external electrode disposed on the body, and the dielectric layer may further include Li and F, and the content of Li included in the dielectric layer is 0.02 mole or more and 0.36 mole or less based on 100 moles of Ba included in the dielectric layer.

Forming Body 110

The method of manufacturing a multilayer electronic component according to an example embodiment includes forming a body 110 including the dielectric layer including Ba and Ti and the internal electrode disposed alternately with the dielectric layer.

As an example of a method of forming the body 110 to include a dielectric layer 111 including Ba and Ti and internal electrodes 121 and 122 disposed alternately with the dielectric layer 111, the body 110 may be formed by printing conductive paste for internal electrode on one surface and the other surface of a dielectric green sheet including barium carbonate-based components.

Also, the internal electrodes 121 and 122 may be formed by printing a conductive paste including one or more of nickel (Ni), copper (Cu), palladium (Pd), silver (Ag), gold (Au), platinum (Pt), tin (Sn), tungsten (W), titanium (Ti) or alloys thereof for internal electrode including the above on a dielectric green sheet, but to reduce the difference in shrinkage behavior with the dielectric layer 111 in the example embodiment, it may be desirable to use a conductive paste for internal electrode including Ni as a main ingredient. In this case including Ni as the main component may indicate that the at % of Ni may be the highest among conductive metals other than glass and dispersants included in the conductive paste for internal electrode.

As the printing method of the conductive paste for the internal electrode, a screen printing method or a gravure printing method, and the example embodiment is not limited thereto.

Forming External Electrodes 130 and 140

After the process of forming the body 110, the external electrodes 130 and 140 may be formed on the body 110.

The method of forming external electrodes 130 and 140 is not limited to any particularly limited. For example, the electrode layer included in the external electrodes 130 and 140 may be formed by dipping a paste including conductive metal and glass, or by transferring a sheet including conductive metal. Also, a paste including conductive metal and resin may be used, or an atomic layer deposition (ALD) method, a molecular layer deposition (MLD) method, a chemical vapor deposition (CVD) method may be used.

Also, when a plating layer is disposed on the electrode layer, the plating layer may be formed using a method such as electrolytic plating or electroless plating.

Hereinafter, in relation to the method of manufacturing the multilayer electronic component 100, the dielectric layer 111 may include Li and F, and a method of controlling the Li content included in dielectric layer 111 to be 0.02 mole or more and 0.36 mole or less based on 100 moles of Ba included in dielectric layer 111.

As described above, the dielectric green sheet may include a barium titanate-based material such as $BaTiO_3$, and as examples of barium titanate-based materials, $BaTiO_3$, $(Ba_{1-x}Ca_x)TiO_3$ ($0<x<1$), $Ba(Ti_{1-y}Ca_y)O_3$ ($0<y<1$), $(Ba_{1-x}Ca_x)(Ti_{1-y}Zr_y)O_3$ ($0<x<1$, $0<y<1$) or $Ba(Ti_{1-y}Zr_y)O_3$ ($0<y<1$), in which Ca (calcium) and Zr (zirconium) are partially dissolved in $BaTiO_3$ may be used. Accordingly, after firing of the body 110, the dielectric layer 111 may include Ba and Ti.

As in the example embodiment described above, the content of Li or F included in the dielectric layer 111 may be adjusted depending on the amount and type of additive added to the dielectric ceramic green sheet.

In an example embodiment, the dielectric layer 111 may be formed by adding LiF, and preferably, may be formed by adding LiF in the form of a sol. In this case when adjusting the amount of LiF added, the content of Li or F included in the dielectric layer 111 may be adjusted.

As the content of LiF added to the dielectric layer 111 increases, the shrinkage initiation temperature of the dielectric layer 111 may be lowered. Specifically, the LiF content added to the dielectric layer 111 may be preferably 0.2 mole or more based on 100 mole of the barium titanate-based component of the dielectric layer 111 such that a shrinkage initiation temperature of the dielectric layer 111 may be lowered and density of the dielectric layer 111 may be improved. However, when the LiF content added to dielectric layer 111 exceeds 1.8 moles based on 100 mole of barium titanate-based component of dielectric layer 111, the LiF content may be excessively high, such that it may be difficult to form sufficiently high insulation resistance of the dielectric layer 111. Accordingly, the content of LiF added to the dielectric layer 111 may be preferably 0.2 mole or more and 1.8 moles or less based on 100 moles of the barium titanate-based component of the dielectric layer 111.

When the content of LiF added to the dielectric layer 111 is 0.2 mole or more and 1.8 moles or less based on 100 mole of the barium titanate-based component of the dielectric layer 111, through firing of the body 110, the content of Li or F included in the dielectric layer 111 may be appropriately adjusted. Specifically, when the content of LiF added to the dielectric layer 111 is 0.2 mole or more and 1.8 moles or less based on 100 moles of the barium titanate-based component of the dielectric layer 111, the content of Li included in the dielectric layer 111 after firing may be 0.02 mole or more and 0.36 mole or less based on 100 moles of Ba included in the dielectric layer, and when the content of LiF added to dielectric layer 111 is 0.2 mole or more and 1.8 moles or less based on 100 moles of barium titanate-based component of dielectric layer 111, the content of F included in the dielectric layer 111 after firing may be 0.49 mole or more and 0.88 mole or less based on 100 moles of Ba included in the dielectric layer.

Between forming the body and forming the external electrode, firing the body may be performed, but an example embodiment thereof is not limited thereto, and the process may be performed after the forming the external electrodes 130 and 140. Also, the firing process may be performed multiple times under different firing atmospheres, rather than being performed only once.

In an example embodiment, when the firing the body is performed between the forming the body and the forming the external electrode, the temperature for firing the body may be 1080° C. or lower.

LiF, a sintering aid added to dielectric layer 111, may have a melting point lower than 1000° C., such that LiF may form a liquid phase from a temperature region lower than the firing temperature (1100-1200° C.) of the multilayer electronic component, and LiF may have a relatively high boiling point of over 1600° C., such that the amount of volatilization during firing may be relatively small. Accordingly, in an example embodiment, by adding LiF to the dielectric layer 111 as a sintering aid and controlling the content thereof, the firing temperature of the body 110 may be lowered to 1080° C. or lower, and discoloration defects and reliability deterioration of the multilayer electronic component may be suppressed.

The size of the multilayer electronic component 100 may not be limited to any particular example. According to the example embodiment, miniaturization and high capacitance may be easily obtained, such that the multilayer electronic component 100 may be applied to small-sized IT products, and as high reliability may be secured in various environments, the multilayer electronic component 100 may also be applied to the size of automotive electronic products requiring high reliability.

Experimental Example 1

Figure 4:
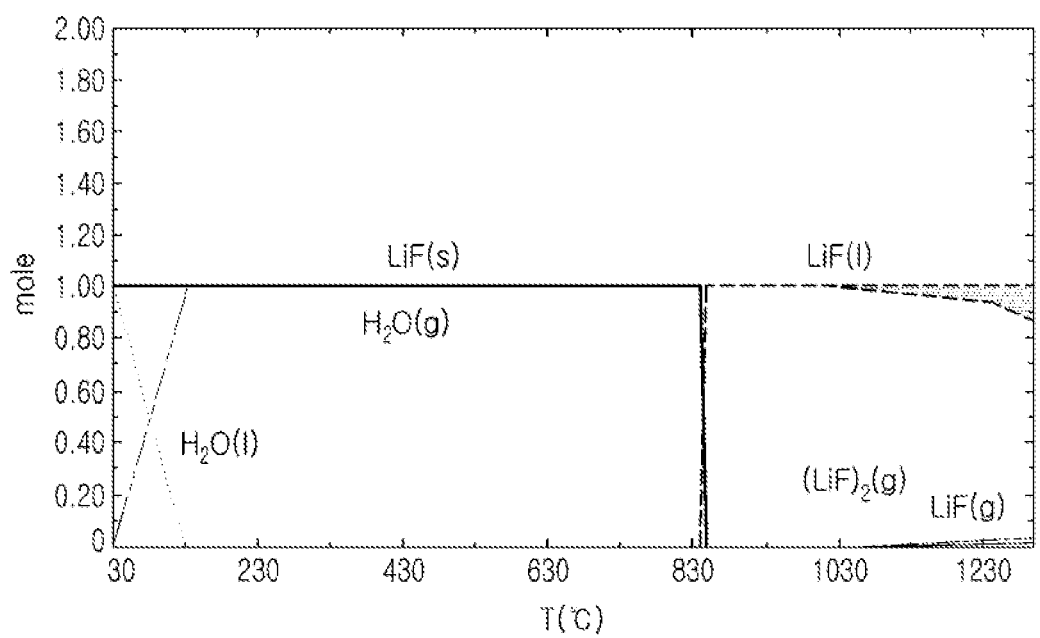
FIG. 4 is a graph illustrating behaviors of LiF and $H_2O$ according to temperatures in a mixed system in which 1 mole of each of LiF and $H_2O$ was added, thermodynamically calculated.

FIG. 4 is a graph illustrating behaviors of LiF and $H_2O$ according to temperatures in a mixed system in which 1 mole of each of LiF and $H_2O$ was added, thermodynamically calculated.

Referring to FIG. 4, when 1 mole of each of LiF and $H_2O$ are added and reacted, $H_2O$ changed from liquid to gas phase as the temperature rises, and a primary phase transition may occur in LiF as LiF changed from solid to liquid near the melting point (845° C.), and began to volatilize above 1050° C. However, the degree of volatilization of LiF was insignificant at 1100° C., the firing temperature region of the multilayer electronic component. In other words, when LiF is added to the dielectric composition to form a dielectric layer, it may be expected that even through the firing process is performed, volatilization of LiF, a low-temperature sintering aid, may be reduced.

Experimental Example 2

Figure 5:
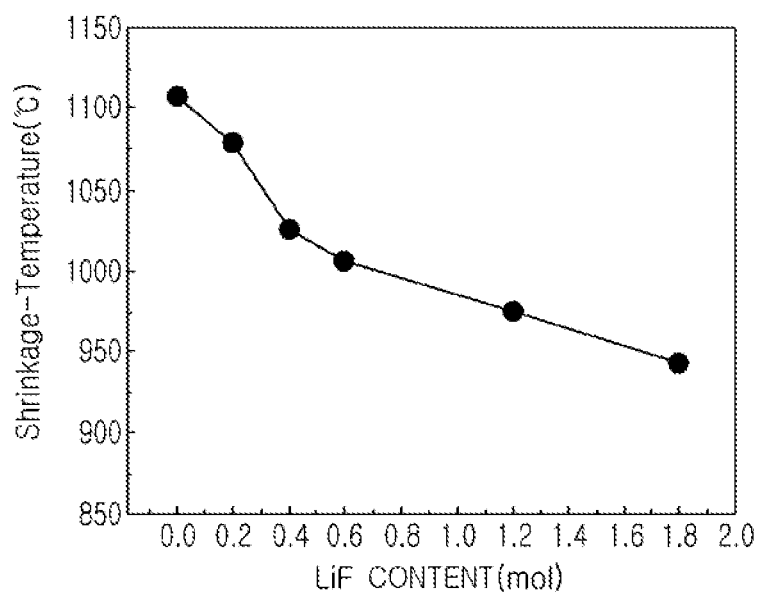
FIG. 5 is a graph illustrating shrinkage initiation temperatures according to LiF contents of LiF samples.

FIG. 5 is a graph illustrating shrinkage initiation temperatures according to LiF contents of LiF samples.

Figure 6:
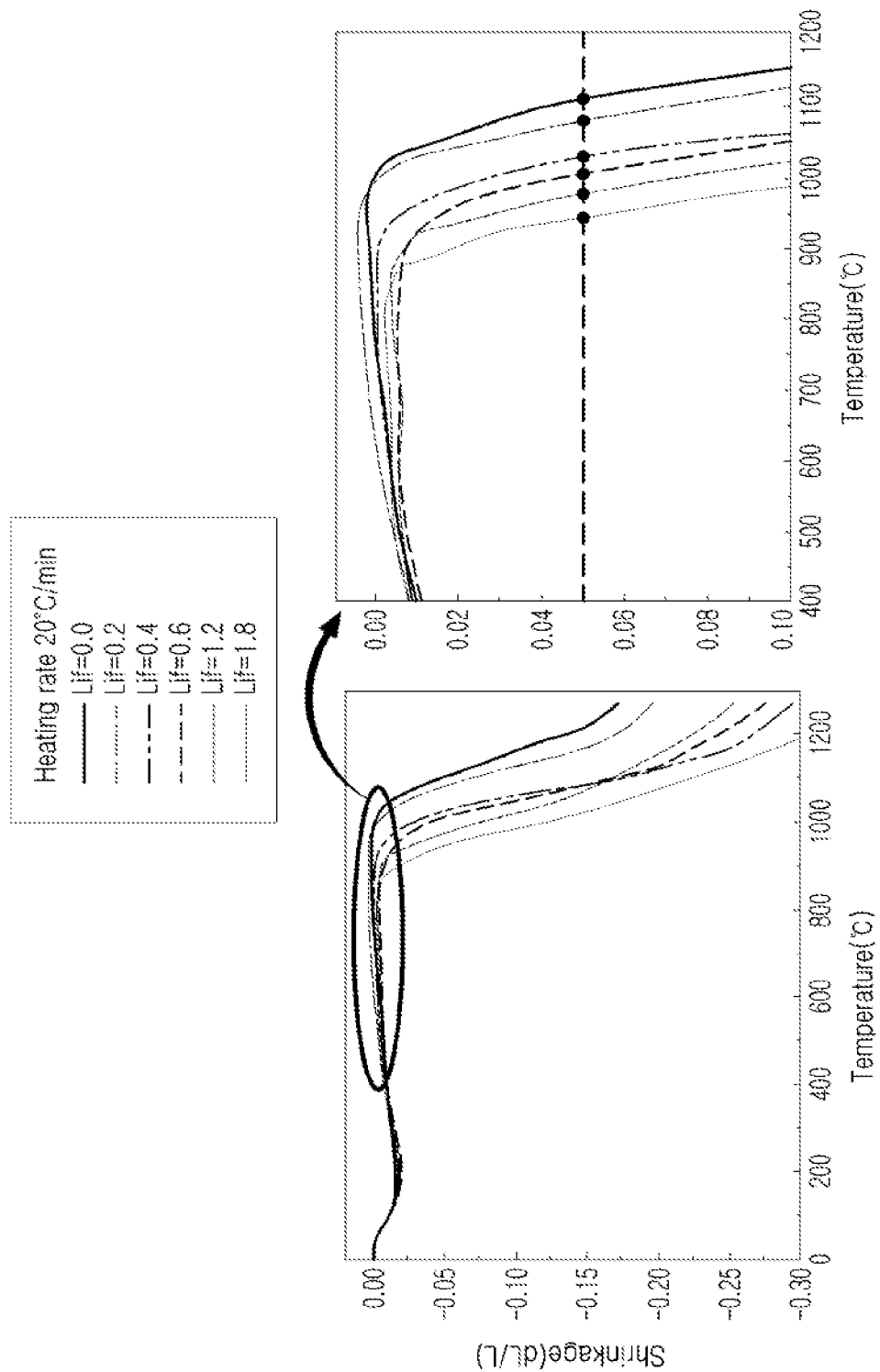
FIG. 6 is a graph illustrating shrinkage behaviors of LiF samples according to LiF contents and temperatures.

FIG. 6 is a graph illustrating shrinkage behaviors of LiF samples according to LiF contents and temperatures.

Referring to FIGS. 5 and 6, as the LiF content increased, shrinkage initiation and high-temperature shrinkage occurred at low temperature, and even with the addition of a small amount, the shrinkage temperature rapidly decreased. In other words, it may be confirmed that as the amount of LiF added increased, density improved and grain growth occurred even at low temperature, and accordingly, it may be expected that firing may be performed at a temperature lower than a generally used firing temperature.

Experimental Example 3

Figure 7A:
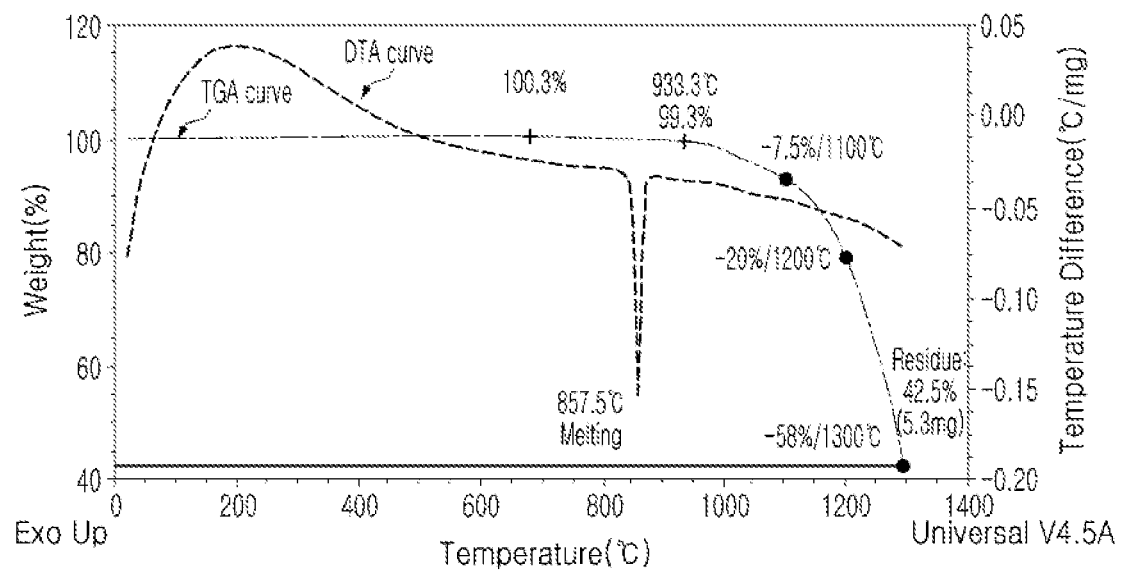
FIG. 7A is a graph illustrating results of TG-DTA test according to an example embodiment.
Figure 7B:
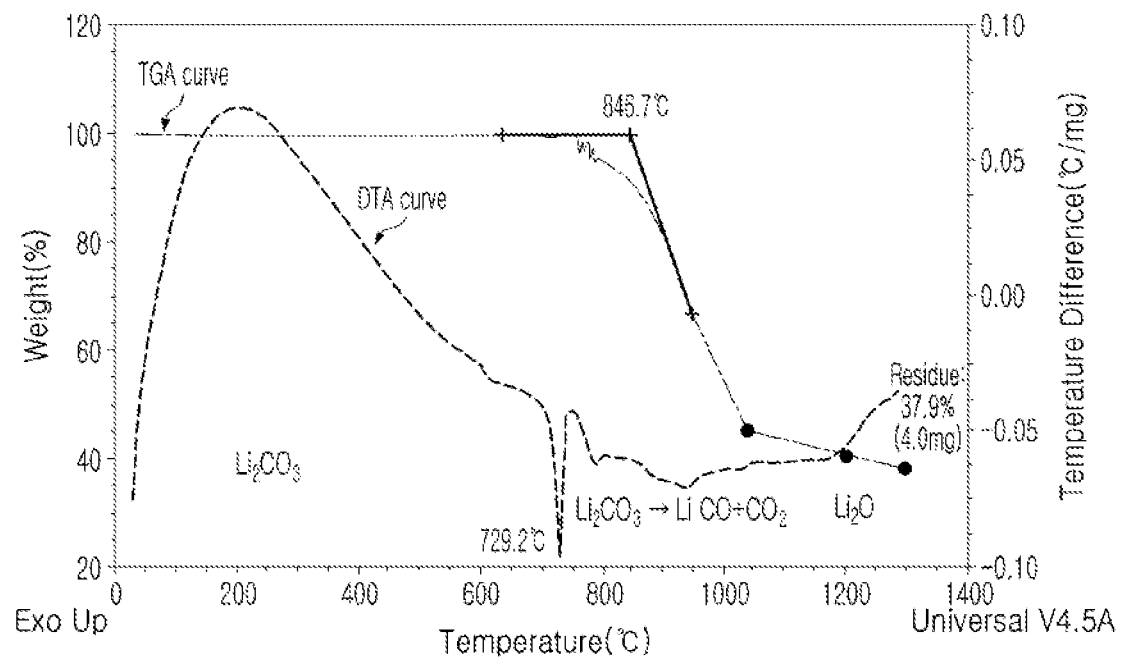
FIG. 7B is a graph illustrating results of TG-DTA test according to a comparative example.

FIG. 7A is a graph illustrating results of TG-DTA test according to an example embodiment. FIG. 7B is a graph illustrating results of TG-DTA test according to a comparative example.

Referring to FIG. 7A, which is the result of an experiment on a sample to which LiF was added as a sintering aid, volatilization of about −7.5% of LIF occurred in the 1100 degree region, which is the appropriate firing temperature region for the multilayer electronic component, and referring to FIG. 7B, which is the result of an experiment on a sample to which $Li_2CO_3$ was added as a sintering aid, an explosive mass loss occurred near the melting point of $Li_2CO_3$, and there was a mass loss of more than −55% in the 1100 degree region, which is the appropriate firing temperature region. That is, when LiF is used as a sintering aid as compared to when $Li_2CO_3$ is used as a sintering aid, the degree of volatilization may be reduced, and accordingly, the content of Li and F included in the dielectric layer after firing may be maintained to be high.

According to the aforementioned embodiments, by adding LiF to the dielectric layer and controlling the content of Li or F included in the dielectric layer, reliability of the multilayer electronic component may be improved.

Also, by adding LiF as a low-temperature sintering aid to the dielectric composition forming the dielectric layer, and by controlling the addition form or composition of LiF, the difference in firing temperatures between the internal electrode and the dielectric layer may be reduced, and reliability of the multilayer electronic component may improve.

While the embodiments have been illustrated and described above, it will be configured as apparent to those skilled in the art that modifications and variations could be made without departing from the scope of the present disclosure as defined by the appended claims.

What is claimed is:

1. A multilayer electronic component, comprising:
a body including (i) a dielectric layer including Ba, Ti, Li, and F, and (ii) internal electrodes disposed alternately with the dielectric layer; and
external electrodes disposed on the body,
wherein a content of Li included in the dielectric layer is 0.02 mole or more and 0.36 mole or less based on 100 moles of Ba included in the dielectric layer.

2. The multilayer electronic component of claim 1, wherein a content of F included in the dielectric layer is 0.49 mole or more and 0.88 mole or less based on 100 moles of Ba included in the dielectric layer.

3. The multilayer electronic component of claim 1,
wherein the dielectric layer includes a plurality of dielectric grains, and
wherein an average grain size of the plurality of dielectric grains is 150 nm or more and 250 nm or less.

4. The multilayer electronic component of claim 1, wherein, when a ratio of an area of a region of the dielectric layer excluding pores to an area of the region of the dielectric layer including pores is defined as density, an average density of the dielectric layer is 95% or more and 99% or less.

5. The multilayer electronic component of claim 1, wherein the internal electrodes include Ni.

6. The multilayer electronic component of claim 1, wherein an average thickness of the dielectric layer is 0.35 μm or less.

7. The multilayer electronic component of claim 1, wherein an average thickness of the internal electrodes is 0.35 μm or less.

8. A method of manufacturing a multilayer electronic component, the method comprising:
a process of forming a body including (i) a dielectric layer including Ba, Ti, Li, and F, and (ii) an internal electrode disposed alternately with the dielectric layer; and
a process of forming an external electrode disposed on the body,
wherein a content of Li included in the dielectric layer is 0.02 mole or more and 0.36 mole or less based on 100 moles of Ba included in the dielectric layer.

9. The method of claim 8, wherein a content of F included in the dielectric layer is 0.49 mole or more and 0.88 mole or less based on 100 moles of Ba included in the dielectric layer.

10. The method of claim 9, wherein the dielectric layer is formed by adding LiF.

11. The method of claim 10, wherein LiF is added in a form of sol.

12. The method of claim 8, further comprising, between the process of forming of the body and the process of forming the external electrode,
a process of firing the body
wherein a temperature of the firing of the body is 1080° C. or lower.

13. A multilayer electronic component, comprising:
a body including
(i) a dielectric layer including Ba, Li, and F, the dielectric layer comprising a plurality of dielectric grains, wherein an average grain size of the plurality of dielectric grains is 150 nm or more and 250 nm or less, and
(ii) internal electrodes disposed alternately with the dielectric layer; and
external electrodes disposed on the body,
wherein a content of Li included in the dielectric layer is 0.02 mole or more and 0.36 mole or less based on 100 moles of Ba included in the dielectric layer.

14. The multilayer electronic component of claim 13, wherein a content of F included in the dielectric layer is 0.49 mole or more and 0.88 mole or less based on 100 moles of Ba included in the dielectric layer.

15. The multilayer electronic component of claim 13, wherein, when a ratio of an area of a region of the dielectric layer excluding pores to an area of the region of the dielectric layer including pores is defined as density, an average density of the dielectric layer is 95% or more and 99% or less.

16. The multilayer electronic component of claim 13, wherein the internal electrodes include Ni.

* * * * *